(12) United States Patent
Nakamura

(10) Patent No.: US 9,375,837 B2
(45) Date of Patent: Jun. 28, 2016

(54) ARM STRUCTURE

(71) Applicant: MITAKA KOHKI CO., LTD., Tokyo (JP)

(72) Inventor: Katsuyuki Nakamura, Tokyo (JP)

(73) Assignee: MITAKA KOHKI CO., LTD., Tokyo (JP)

( * ) Notice: Subject to any disclaimer, the term of this patent is extended or adjusted under 35 U.S.C. 154(b) by 176 days.

(21) Appl. No.: 14/190,718

(22) Filed: Feb. 26, 2014

(65) Prior Publication Data

US 2014/0245855 A1    Sep. 4, 2014

(30) Foreign Application Priority Data

Mar. 1, 2013    (JP) .................... 2013-040302

(51) Int. Cl.
| | |
|---|---|
| B25J 1/02 | (2006.01) |
| B25J 18/00 | (2006.01) |
| B25J 9/10 | (2006.01) |
| F21V 21/26 | (2006.01) |
| G01B 21/04 | (2006.01) |
| F21V 21/34 | (2006.01) |
| B25J 19/00 | (2006.01) |
| F16M 13/00 | (2006.01) |
| A47F 5/00 | (2006.01) |

(52) U.S. Cl.
CPC ............ *B25J 9/1065* (2013.01); *B25J 19/0016* (2013.01); *F21V 21/26* (2013.01); *F21V 21/34* (2013.01); *G01B 21/047* (2013.01); *A47F 5/0087* (2013.01); *F16M 13/00* (2013.01); *Y10T 74/20329* (2015.01)

(58) Field of Classification Search
CPC ...... F16M 13/00; A47F 5/0087; F21V 21/26; F21V 21/34; F21V 21/403; G01B 21/047
USPC ........... 248/280.11, 292.11, 281.11; 362/804, 362/427; 74/490.01, 490.05
See application file for complete search history.

(56) References Cited

U.S. PATENT DOCUMENTS

| | | | | |
|---|---|---|---|---|
| 4,080,530 A | * | 3/1978 | Krogsrud | F16M 11/04 248/280.11 |
| 4,501,557 A | * | 2/1985 | Tamura | A61B 6/447 362/427 |
| 5,339,233 A | * | 8/1994 | Yang | F16M 11/04 362/345 |

FOREIGN PATENT DOCUMENTS

JP    06-309915    11/1994

* cited by examiner

*Primary Examiner* — William C Joyce
*Assistant Examiner* — Randell J Krug
(74) *Attorney, Agent, or Firm* — Greenblum & Bernstein P.L.C.

(57) ABSTRACT

When the compression spring is compressed due to the relative displacement of the stopper which occurs in response to the tilt angle of the arm structure, the compression spring is compressed by the small relative displacement of the stopper over its entire body in the longitudinal direction, so that a repulsive force is obtained which varies little over the entire range of the tilt angle, enabling support of the heavy object in a stable condition.

11 Claims, 2 Drawing Sheets

ARM STRUCTURE

BACKGROUND OF THE INVENTION

The present invention relates to an arm structure.

An arm structure is known in which, with one end side thereof being a center, the other end side can be tilted around it, and a vertical position of a heavy object supported on the other end side can be changed by tilting, as illustrated in Japanese Unexamined Patent Application Publication No. JP 06-309915 A. In such an arm structure, a spring is provided to each joint of the arm structure so as to generate a force in an anti-tilting direction so that the heavy object is stopped at any vertical position.

SUMMARY OF THE INVENTION

However, in the above related technique, because only a repulsive force around an axis is exerted by the spring provided to the joint, the repulsive force varies depending on the tilt angle, making it difficult to support the heavy object at any vertical position in a stable condition.

The present invention is made focusing on such a related technique. According to the present invention, it is possible to provide an arm structure which can support the heavy object at any vertical position in a stable condition with little variation of the repulsive force.

According to a technical aspect of the present invention, the arm structure is an arm structure, in which a parallel link mechanism is formed by connecting a fixed portion and a movable portion via two parallel first arm and second arm having rotating shafts at both ends thereof, and the movable portion side is freely tilted and rotated in a gravity direction (plumb line) around the respective rotating shafts of the first arm and the second arm on the fixed portion side with a heavy object being supported by the movable portion. The arm structure comprising a spring which expands and contracts linearly along the first arm; and a stopper which receives one end of the spring, engaging it to the second arm, wherein when the movable portion side is tilted, the spring is expanded/contracted due to a relative displacement of the stopper with respect to the first arm so as to generate a repulsive force in an anti-tilting direction.

DESCRIPTION OF THE PREFERRED EMBODIMENTS

Figure 1:
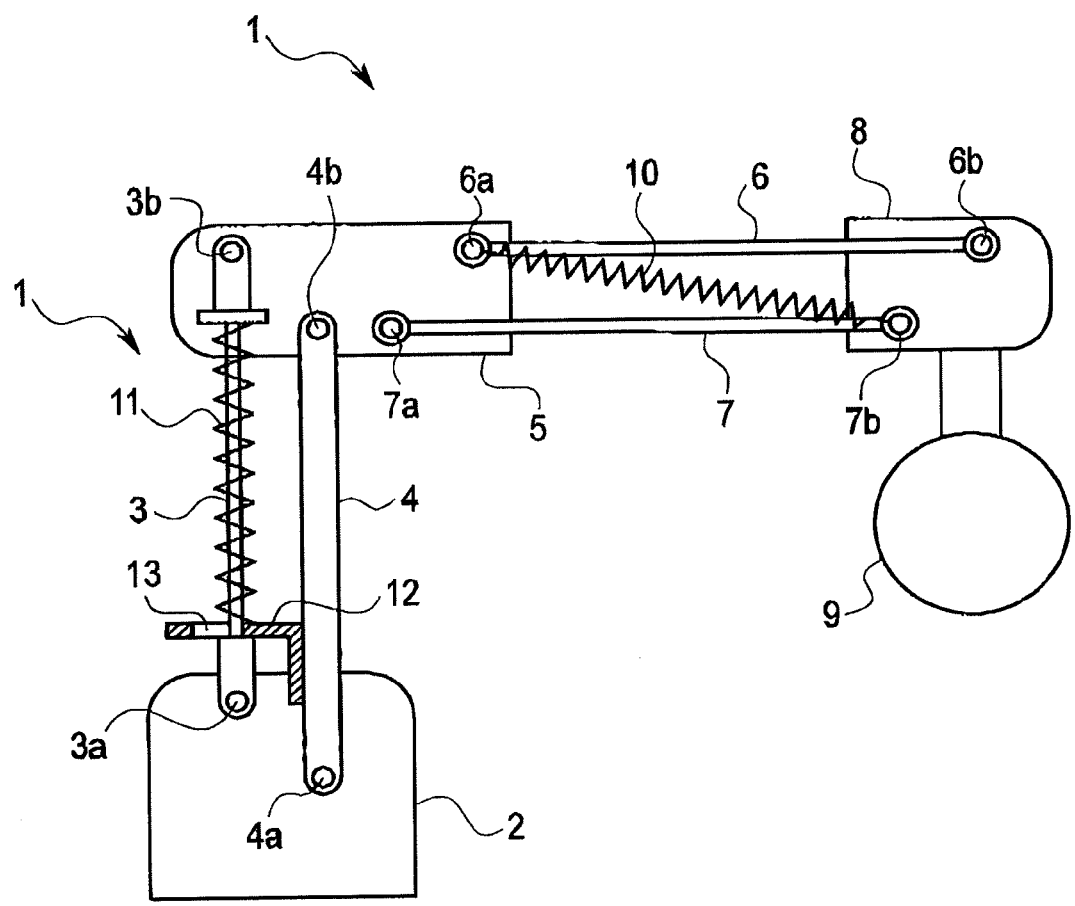
FIG. 1 is an overall view showing an arm structure.
Figure 2:
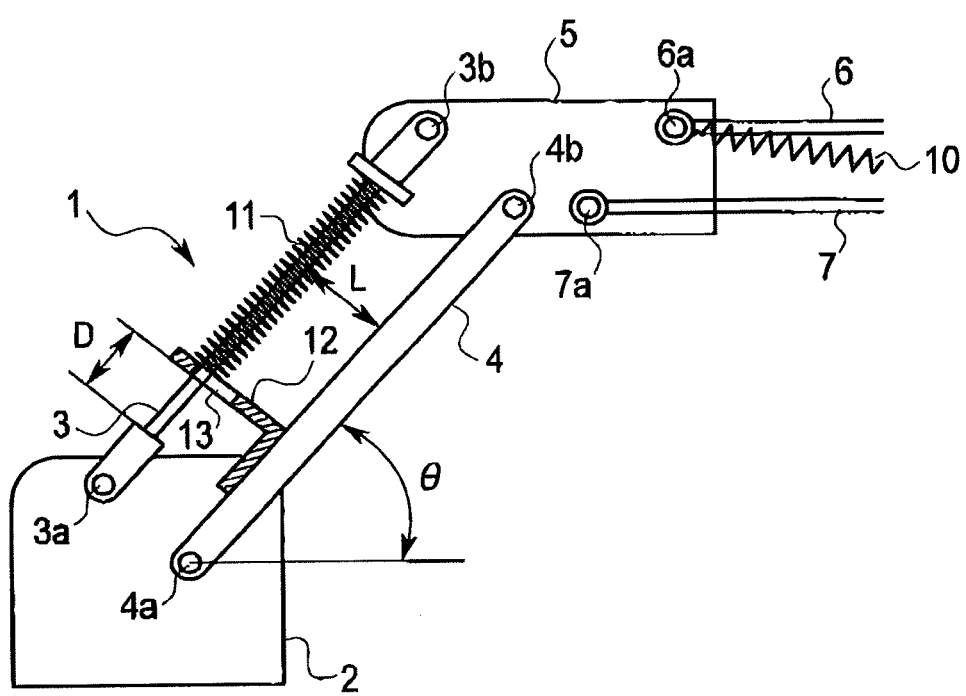
FIG. 2 is an overall view showing the arm structure in a tilted condition.

FIG. 1 and FIG. 2 are views showing a preferred embodiment of the present invention.

FIG. 1 is an overall view showing an arm structure 1. A fixed portion 2 is fixed in an immobile condition. However, this fixed portion 2 may be supported by an additional stand, etc. and may change its position. That is, in this arm structure 1, the fixed portion 2 serves as a reference for movement.

Respective rotating shafts 3a and 4a of the first arm 3 and the second arm 4 are pivotally supported on the fixed portion 2. The respective rotating shafts 3a and 4a are arranged with an inclination of 45 degrees with respect to a horizontal direction. The first arm 3 and the second arm 4 are equal in length, and they are in a reference condition when vertical.

A movable portion 5 is pivotally supported on the other rotating shafts 3b and 4b of the first arm 3 and the second arm 4. The respective rotating shafts 3b and 4b in the movable portion 5 are also arranged with an inclination of 45 degrees.

Since the first arm 3 and the second arm 4 are parallel and equal in length, a parallel link mechanism is established by an imaginary link side 3a-4a fixed on the fixed portion 2 and an imaginary link side 3b-4b fixed on the movable portion 5.

A forefront portion 8 is connected to the movable portion 5 via two upper and lower arms 6 and 7, and a device 9 is supported by the forefront portion 8. An extension coil spring 10 is provided between a rotating shaft 6a at one end of the upper arm 6 and a rotating shaft 7b at the other end of the lower arm 7. In this embodiment, the arms 6 and 7, the forefront portion 8, the device 9, and the extension spring 10 form a "heavy object" as a heavy load.

A compression coil spring 11 is provided to the first arm 3 between the fixed portion 2 and the movable portion 5 along the nearly entire length thereof. The compression coil spring 11 is provided outside the first arm 3 to surround the same. A stopper 12 is fixed to the second arm 4 on the lower side thereof. The stopper 12 has a plane surface which extends toward the first arm 3 perpendicular to a main axis direction of the second arm so as to receive the compression spring 11 which expands and contracts along the first arm 3. As can been in FIG. 1, the horizontal planar surface of the stopper 12 defines a plate. Further, a through-hole 13 is formed in the stopper 12 in the form of a slot. The through-hole 13 is elongate and sized so that only the first arm 3 can pass therethrough whereas the compression spring 11 cannot. Thus, the lower end of the compression spring 11 is received by the periphery of the through-hole 13 in this stopper 12. One end of the compression spring 11 is fixed relative to the rotating shaft 3b, and the other end, while biasing the stopper 12, can slide along the biased plane surface. The compression spring 11 expands and contracts in a direction perpendicular to the biased surface of the stopper 12, and generates torque around the rotating shaft 4a by biasing the stopper 12.

FIG. 2 shows the arm structure 1 in a tilted condition. When the movable portion 5 side is tilted with respect to the fixed portion 2, a relative displacement D of the stopper 12 occurs so as to compress the compression spring 11. As a result, a repulsive force of the compression spring 11 acts so that the position of the movable portion 5 is maintained even when the entire body is tilted. That is, the repulsive force as a counterforce compensates a torque around the rotating shafts 3a and 4a caused due to the tilting of the parallel link.

As a tilt angle θ of the arm structure 1 increases, the displacement D and thus the repulsive force also increases, so that weight balance can be achieved at each tilt angle θ and the device 9 can be held at any vertical position. That is, in other words, while clockwise torque around the rotating shaft 4a due to weight of the heavy object increases in accordance with the tilt angle θ, counterclockwise torque around the rotating shaft 4a due to the compression spring 11 and the stopper 12 also increases in accordance with the tilt angle θ, so that a good torque balance can be achieved and maintained.

Although tilting the arm structure 1 also increases a distance L between the first arm 3 and the second arm 4, a change in the distance L between the first arm 3 and the second arm 4 can be absorbed as well because of the elongate form of the through-hole 13.

Note that although, in the present embodiment, the imaginary link side 3a-4a is inclined at 45° with respect to the horizontal direction, this is not limiting and the imaginary link side may be inclined by any given angle from the horizontal direction.

Alternatively, a similar working effect can also be obtained by use of an extension spring supported between the rotating shaft 3a and the stopper 12 and provided along the first arm, instead of the compression spring 11.

As described above, when the compression spring 11 is compressed due to the relative displacement of the stopper 12 which occurs in response to the tilt angle θ of the arm structure 1, the compression spring 11 is compressed by the relative displacement D of the stopper 12 over its entire body in the longitudinal direction, so that a repulsive force is obtained which varies little over the entire range of the tilt angle θ, enabling support of the device 9 in a stable condition.

According to the present invention, when the compression spring is compressed due to the relative displacement of the stopper which occurs in response to the tilt angle of the arm structure, the compression spring is compressed by the small relative displacement of the stopper over its entire body in the longitudinal direction, so that a repulsive force is obtained which varies little over the range of the tilt angle, enabling support of the heavy object in a stable condition.

Further, since only the first arm is allowed to pass through the through-hole of the stopper, it is possible to receive the end of the compression spring on the periphery of the through-hole. Further, because of the slot form of the through-hole, it is also possible to accommodate a change in the distance between the first arm and the second arm with tilting.

Moreover, a repulsive force with less variation is obtained because of the stopper structure which corresponds to the tilt angle.

This application claims benefit of priority under 35USC §119 to Japanese Patent Applications No. 2013-040302, filed on Mar. 1, 2013, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. An arm structure having a parallel linkage formed by connecting a fixed portion and a movable portion via two parallel arms, a first arm and a second arm parallel to the first arm, each arm having rotating shafts at both ends thereof, the movable portion supporting an object and tiltable about the respective rotating shafts of the first arm and the second arm with respect to a gravity direction, the arm structure comprising:

a spring expanding and contracting linearly along the first arm; and a stopper fixed relative to the second arm and receiving one end of the spring, the stopper including a planar surface perpendicular to a longitudinal axis of the second arm, the planar surface including an elongated hole, the first arm passing through the hole and one end of the spring resting on the planar surface of the stopper, the stopper comprising an L-shaped member, one leg of the L-shaped member comprising the planar surface, the planar surface defining a plate, the other leg of the L-shaped member secured to the second arm, the one end of the spring directly contacting a periphery of the elongated hole;

wherein, when the movable portion is tilted, the spring is expanded/contracted due to a relative displacement of the stopper with respect to the first arm so as to generate a repulsive force in an anti-tilting direction.

2. The arm structure of claim 1, wherein
the spring is provided outside the first arm, and
the elongated through-hole is configured to allow only the first arm to pass therethrough.

3. The arm structure of claim 1, wherein,
the first and second arms of a parallel link mechanism defined by the two rotating shafts of the fixed portion are arranged to be inclined with respect to a horizontal direction.

4. The arm structure according to claim 1, the elongated hole is sized such that the first arm can pass through the hole and the spring cannot pass through the hole.

5. The arm structure according to claim 1, wherein a distance between a rotating shaft of the first arm and the stopper changes in accordance with a tilt angle of the arm structure.

6. The arm structure according to claim 1, wherein a distance between the first arm and the second arm changes in accordance with a tilt angle of the arm structure.

7. The arm structure according to claim 1, the first and second arms being equal in length such that a parallel link mechanism is configured by the rotating shafts at each of first and second ends of the first and second arms.

8. The arm structure according to claim 1, wherein the spring surrounds a portion of the first arm.

9. The arm structure according to claim 1, the parallel linkage comprises a parallelogram linkage.

10. The arm structure according to claim 1, wherein a line joining the rotating shafts at a first end of the first and second arms is inclined at a predetermined angle with respect to a reference plane, and a line joining the rotating shafts at a second end of the first and second arms is inclined at the same predetermined angle with respect to the reference plane.

11. The arm structure according to claim 10, wherein the predetermined angle is 45° with respect to a horizontal plane.

* * * * *